Nov. 6, 1928.
F. WALTHER
TOOTHED GEARING FOR BUILDING TOYS
Filed May 16, 1927
1,690,349
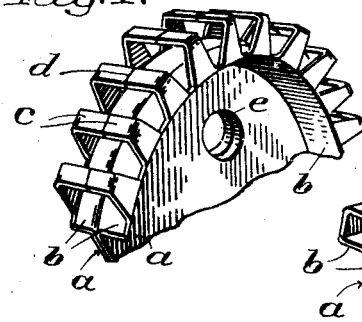
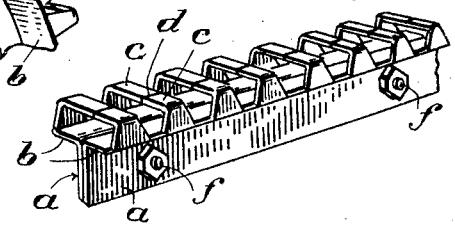
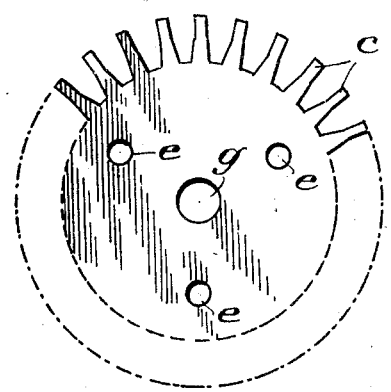
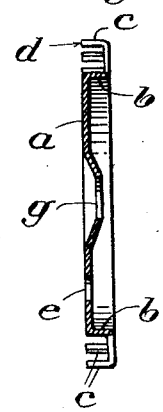
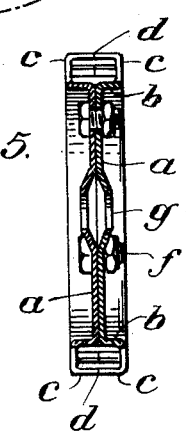
Inventor:
Franz Walther Patented Nov. 6, 1928.

1,690,349

UNITED STATES PATENT OFFICE.

FRANZ WALTHER, OF BERLIN, GERMANY.

TOOTHED GEARING FOR BUILDING TOYS.

Application filed May 16, 1927, Serial No. 191,892, and in Germany October 29, 1926.

The invention is illustrated diagrammatically and by way of example on the accompanying drawing, on which Figure 1 is a perspective representation of a portion of a cog-wheel designed according to this invention; Figure 2 is a perspective representation of a portion of a rack, also designed according to this invention; Figure 3 shows a sheet-metal disk as used for manufacturing cog-wheels of the kind shown in Fig. 1, this disk being drawn to a slightly reduced scale relatively to Fig. 1; Figure 4 is a cross-section through one of two members as necessary for manufacturing a cog-wheel of the kind shown in Fig. 1, and Figure 5 is a cross-section through a finished cog-wheel, all as fully described hereinafter.

A cog-wheel designed according to this invention consists of two members $a$, each being formed by a sheet-metal disk having as many radial lugs $c$ as the cog-wheel is to have teeth. All teeth are bent at right angles, but besides this, each disk is so shaped by a matrix and a patrix that it is provided with a rim $b$ extending at right angles to the plane of the body portion of the disk, and is provided also with a central hole $g$ and some other holes $e$. The end portions of the lugs $c$ extend counter to the rim $b$ of each disk or semi-wheel, and two such semi-wheels are connected with each other by bolts and nuts $f$ or by rivets etc. in such a manner that the ends of the lugs or teeth $c$ extend towards or against one another and contact with each other at $d$, as in Fig. 1.

The holes $g$ serve for the reception of an axle or a shaft.

I wish it to be understood that the two disks pertaining to one wheel may be connected with each other also by other means than by holes $e$ and bolts $f$. They may be connected with each, for instance, by the shaft (not shown) if this is provided with a collar on one side of the wheel and with a thread and a nut thereon on the other side of the wheel, the disks being then pressed against one another and said collar by said nut.

The centre portions of the disks $a$ may be either flat or bulged out as in Figs. 4 and 5. Or the centre portion just around the holes $g$ may be reinforced by a collar also formed by a part of the metal of the disk, the object being also in this case to provide for a good seating of the wheel upon the shaft or axle.

The same manufacturing principle as used for wheels is used also for racks, as appears from Fig. 2, in which the same letters of reference denote similar parts as in the other figures already dealt with. The only difference resides therein that strips of metals instead of disks are employed but in all other respects the arrangement and combination of the parts forming a rack is practically the same as with cog-wheels, as will be clear without further details.

This improved gearing for building-toys presents important advantages over the known ones, in that it is made from sheet-metal parts that are punched out of sheet-metal plates, and pressed into the required shape, and in that it is, although being very cheap, nevertheless very strong and durable.

I claim:

A toothed gearing for building-toys, comprising two sheet-metal members of practically equal design, each having a rim extending at an angle with respect to the body portion of the member, and having a set of lugs extending forth from the rim, each lug being twice bent angularly and the two members being so connected with each other that their bent lugs abut against one another and form teeth, substantially as set forth.

In testimony whereof I affix my signature.

FRANZ WALTHER.